(12) United States Patent
Davis (10) Patent No.: US 10,436,586 B1
(45) Date of Patent: Oct. 8, 2019

(54) ADJUSTABLE LASER LINE, LEVEL, AND SQUARE

(71) Applicant: Drew Davis, Charlotte, TN (US)

(72) Inventor: Drew Davis, Charlotte, TN (US)

( * ) Notice: Subject to any disclaimer, the term of this patent is extended or adjusted under 35 U.S.C. 154(b) by 213 days.

(21) Appl. No.: 15/695,062

(22) Filed: Sep. 5, 2017

(51) Int. Cl.
*G01C 15/00* (2006.01)
*B43L 7/00* (2006.01)
*B43L 7/14* (2006.01)
*B43L 7/12* (2006.01)
*G01C 9/34* (2006.01)

(52) U.S. Cl.
CPC ............ *G01C 15/004* (2013.01); *B43L 7/005* (2013.01); *B43L 7/12* (2013.01); *B43L 7/14* (2013.01); *G01C 9/34* (2013.01)

(58) Field of Classification Search
CPC ... G01C 9/26; G01C 9/28; G01C 9/34; G01C 15/004; G01C 15/105; G01C 25/00; G01C 9/24; B43L 7/12; B43L 7/007; B43L 7/0275; B43L 7/14; B43L 7/02; B43L 7/027; B43L 12/02; B43L 7/005; B43L 7/00; B43L 7/023
USPC .................................................... 33/473, 484
See application file for complete search history.

(56) References Cited

U.S. PATENT DOCUMENTS

| 5,119,565 A * | 6/1992 | Horvath | G01C 9/28 33/405 |
|---|---|---|---|
| 5,566,459 A | 10/1996 | Breda | |
| 5,604,987 A * | 2/1997 | Cupp | G01C 15/008 33/275 R |
| 5,713,135 A * | 2/1998 | Acopulos | G01B 3/56 33/1 PT |
| 5,842,282 A | 12/1998 | Ting | |
| 5,864,956 A | 2/1999 | Dong | |
| 6,167,630 B1 * | 1/2001 | Webb | B25H 7/00 33/354 |
| 6,230,416 B1 * | 5/2001 | Trigilio | B43L 7/027 33/451 |
| 6,594,910 B2 | 7/2003 | Wishart | |
| 6,839,974 B1 * | 1/2005 | Hitchcock | B25H 7/00 33/419 |
| 7,430,810 B2 | 10/2008 | Sergyeyenko | |
| D613,194 S | 4/2010 | Silbergerg | |
| 7,802,372 B1 * | 9/2010 | Silberberg | G01C 15/008 33/371 |
| 2001/0049879 A1 * | 12/2001 | Moore, Jr. | G01C 15/008 33/376 |

(Continued)

FOREIGN PATENT DOCUMENTS

EP 1033555 A1 9/2000

*Primary Examiner* — Yaritza Guadalupe-McCall (57) ABSTRACT

The adjustable laser line, level, and square is a leveling tool. The adjustable laser line, level, and square comprises a pedestal, a slewing bearing, a stanchion, a drafting triangle, and a laser. The laser and the drafting triangle are attached to the stanchion. The slewing bearing attaches the stanchion to the pedestal. The laser generates a straight beam of light that is used to form a straight line along the surface. The adjustable laser line, level, and square allows for the adjustment of both the azimuth angle and the polar angle of the laser. The slewing bearing is used to adjust the azimuth angle. The drafting triangle is used to adjust the polar angle. The stanchion further comprises a plurality of bubble levels that measure the angle of the stanchion relative to the force of gravity.

15 Claims, 5 Drawing Sheets

(56) References Cited

U.S. PATENT DOCUMENTS

| | | | | |
|---|---|---|---|---|
| 2003/0037453 A1* | 2/2003 | Mastrobattista | ..... | B23Q 9/0042 33/640 |
| 2005/0166411 A1* | 8/2005 | Scorvo | ................. | A01K 87/007 33/471 |
| 2007/0245581 A1* | 10/2007 | Hios | ......................... | B43L 7/10 33/429 |

* cited by examiner

ADJUSTABLE LASER LINE, LEVEL, AND SQUARE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of instruments and measurements, more specifically, an active optical surveying instrument configured for use in generating reference lines.

SUMMARY OF INVENTION

The adjustable laser line, level, and square is a leveling tool. The adjustable laser line, level, and square comprises a pedestal, a slewing bearing, a stanchion, a drafting triangle, and a laser. The laser and the drafting triangle are attached to the stanchion. The slewing bearing attaches the stanchion to the pedestal. The laser generates a straight beam of light that is used to form a straight line along the surface. The adjustable laser line, level, and square allows for the adjustment of both the azimuth angle and the polar angle of the laser. The slewing bearing is used to adjust the azimuth angle. The drafting triangle is used to adjust the polar angle. The stanchion further comprises a plurality of bubble levels that measure the angle of the stanchion relative to the force of gravity.

These together with additional objects, features and advantages of the adjustable laser line, level, and square will be readily apparent to those of ordinary skill in the art upon reading the following detailed description of the presently preferred, but nonetheless illustrative, embodiments when taken in conjunction with the accompanying drawings.

In this respect, before explaining the current embodiments of the adjustable laser line, level, and square in detail, it is to be understood that the adjustable laser line, level, and square is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the adjustable laser line, level, and square.

It is therefore important that the claims be regarded as including such equivalent construction insofar as they do not depart from the spirit and scope of the adjustable laser line, level, and square. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
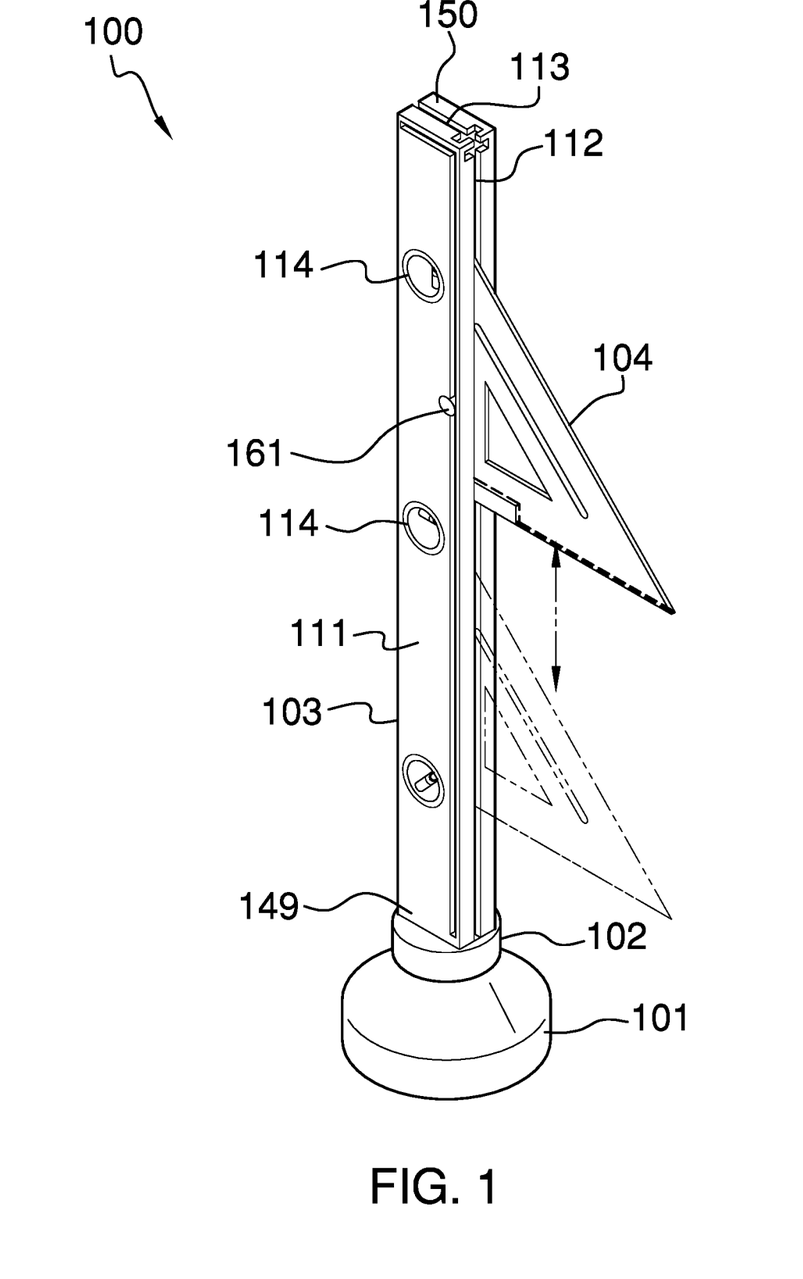
FIG. 1 is a perspective view of an embodiment of the disclosure.
Figure 2:
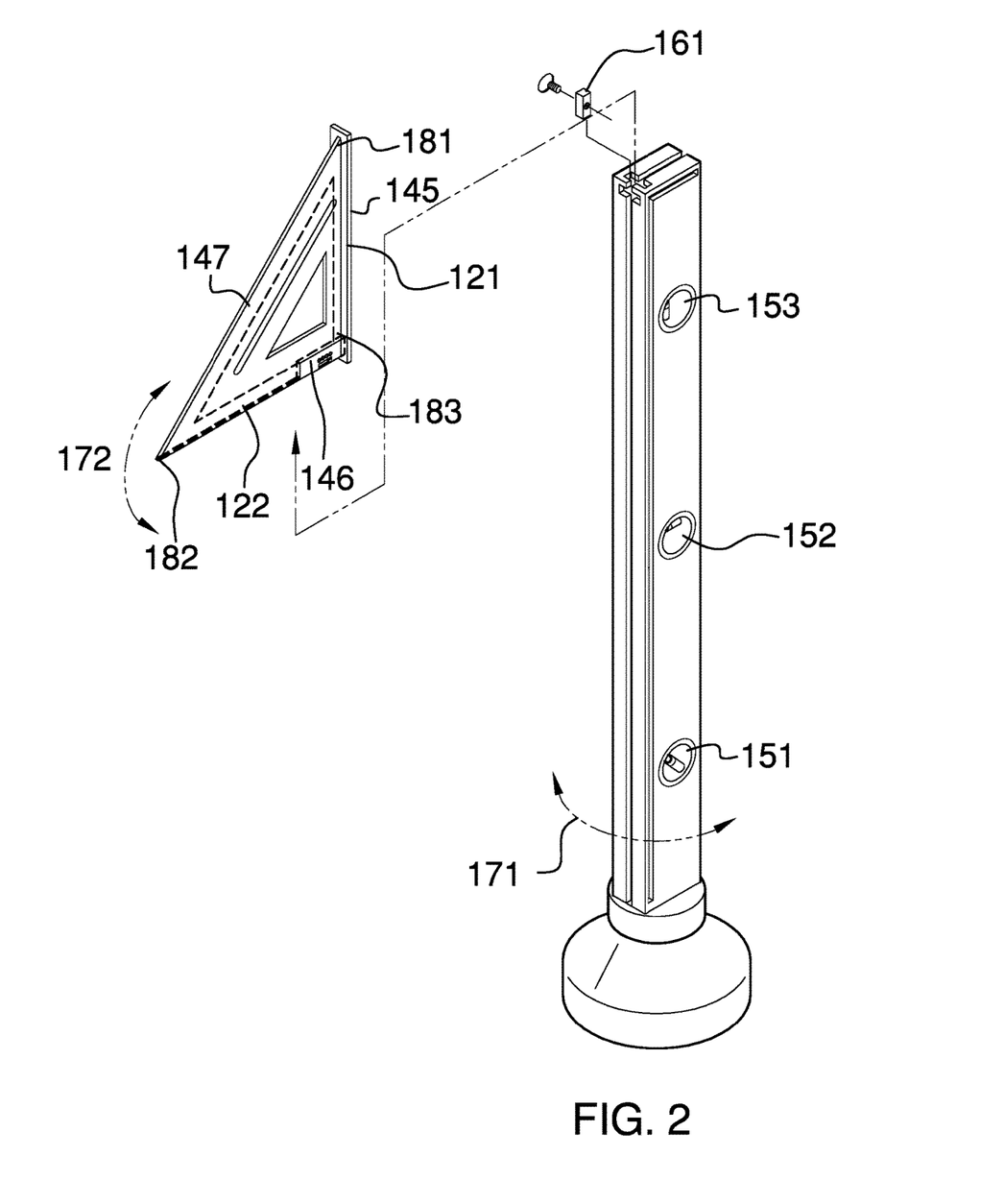
FIG. 2 is a reverse perspective view of an embodiment of the disclosure.
Figure 3:
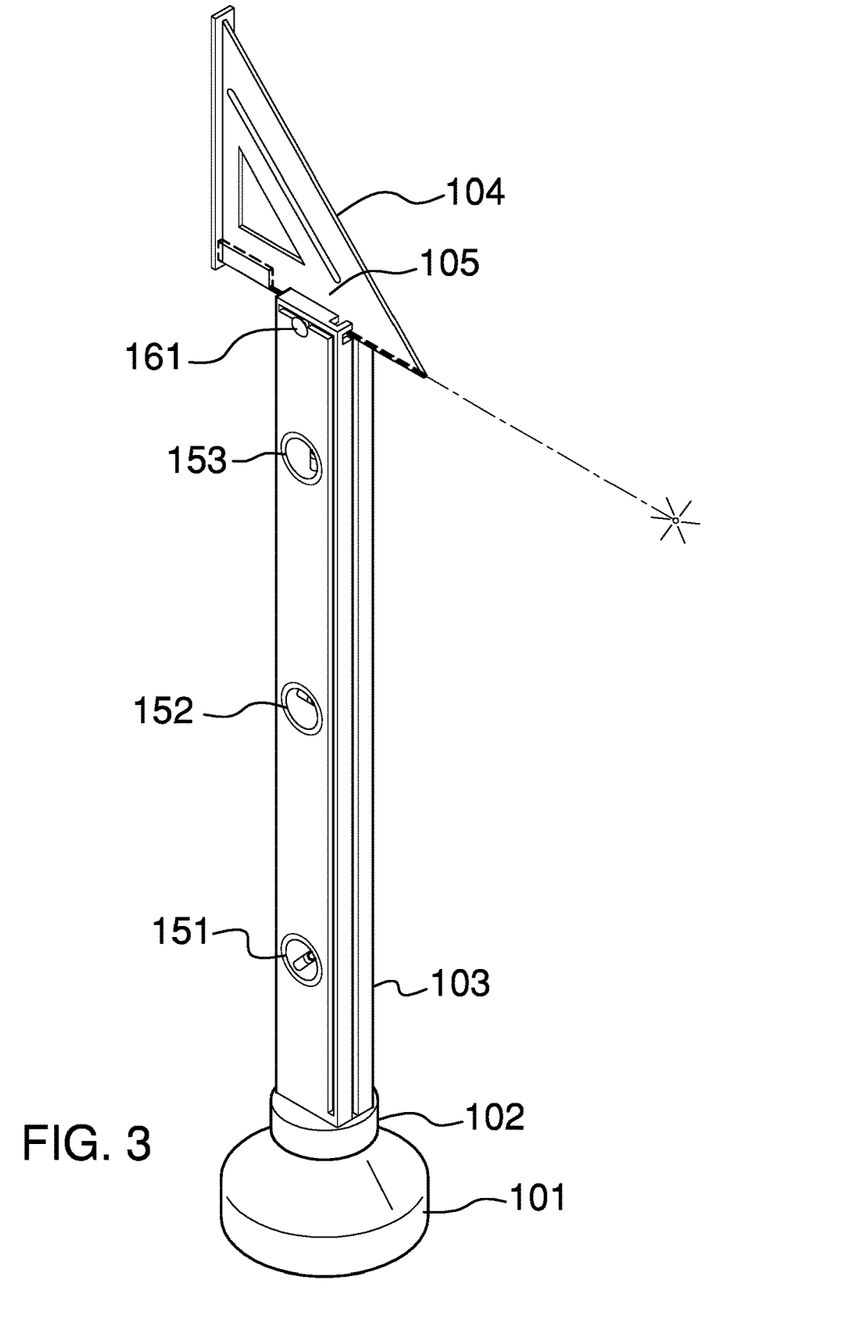
FIG. 3 is an alternate perspective view of an embodiment of the disclosure.
Figure 4:
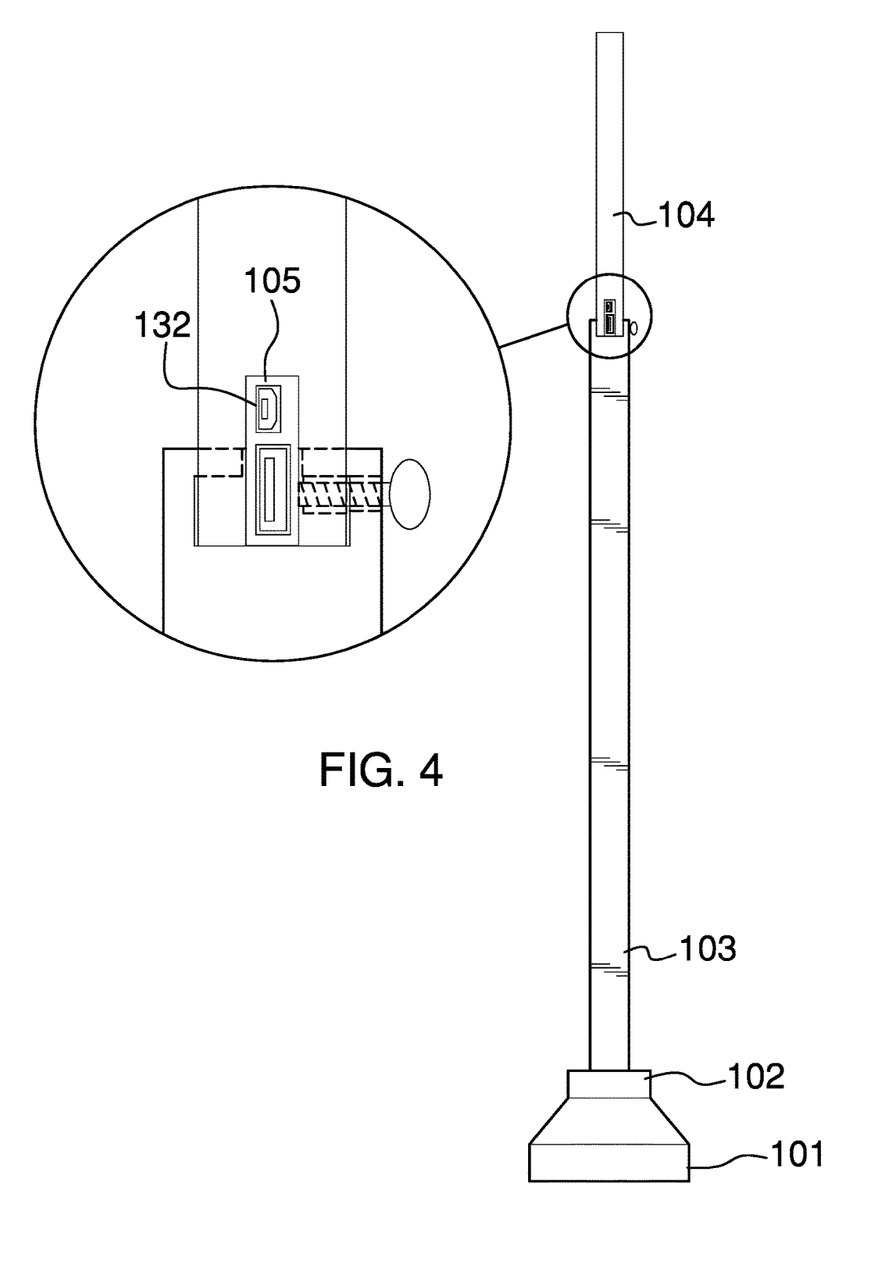
FIG. 4 is a rear view of an embodiment of the disclosure.
Figure 5:
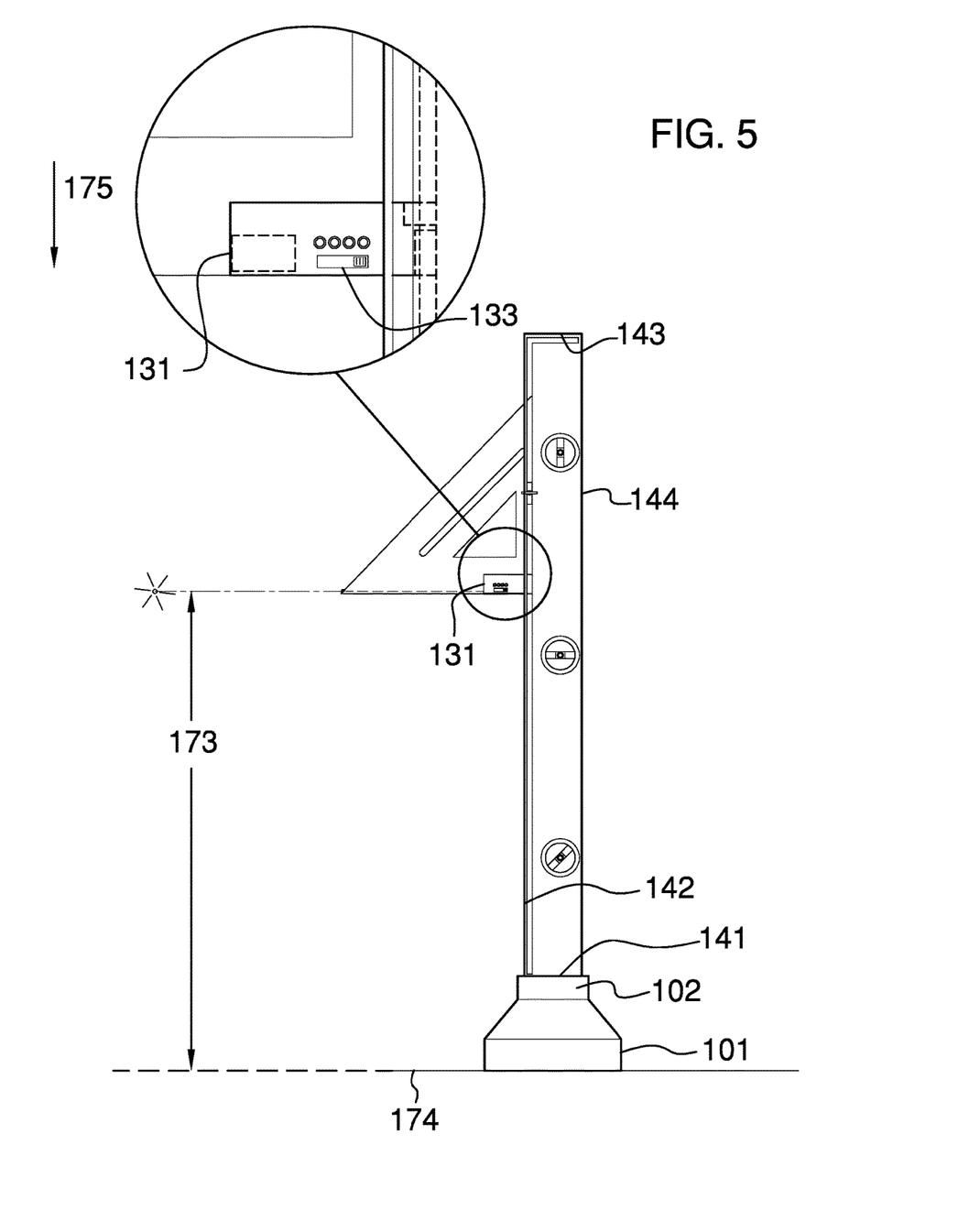
FIG. 5 is a side view of an embodiment of the disclosure.

Detailed reference will now be made to one or more potential embodiments of the disclosure, which are illustrated in FIGS. 1 through 5.

The adjustable laser line, level, and square 100 (hereinafter invention) is a leveling tool. The invention 100 comprises a pedestal 101, a slewing bearing 102, a stanchion 103, a drafting triangle 104, and a laser 105. The laser 105 and the drafting triangle 104 are attached to the stanchion 103. The slewing bearing 102 attaches the stanchion 103 to the pedestal 101. The laser 105 generates a straight beam of light that is used to form a straight line along a surface. The invention 100 allows for the adjustment of both the azimuth angle 171, the polar angle 172 and the height 173 of the laser 105. The slewing bearing 102 is used to adjust the azimuth angle 171. The drafting triangle 104 is used to adjust the polar angle 172. The stanchion 103 further comprises a plurality of bubble levels 114 that measure the angle of the stanchion 103 relative to the force of gravity 175.

The pedestal 101 is the inferior structure of the invention 100. The pedestal 101 is the final link in the load path to the supporting surface 174 and generally supports the invention 100.

The slewing bearing 102 is a commercially available slewing bearing 102. The slewing bearing 102 attaches the inferior end of the stanchion 103 to the superior surface of the slewing bearing 102.

The stanchion 103 is a shaft like structure that projects perpendicularly away from the supporting surface 174. The inferior end 149 of the stanchion 103 attaches to the slewing bearing 102 such that the slewing bearing 102 will rotate the stanchion 103 such that the axis of rotation of the stanchion 103 is aligned with the center axis of the stanchion 103. The rotation of the stanchion 103 adjusts the azimuth angle 171 of the laser 105. The stanchion 103 comprises a post 111, a first channel 112, a second channel 113, and a plurality of bubble levels 114. The post 111 is further defined with a first edge 141, a second edge 142, a third edge 143, and a fourth edge 144.

The first edge 141 forms the inferior end 149 of the stanchion 103. The second edge 142 is a vertical edge of the post 111. The third edge 143 forms the superior end 150 of the stanchion 103. The fourth edge 144 is a vertical edge of the post 111. The inferior end 149 is the lowest point of the stanchion 103 that attaches to the slewing bearing 102. The superior end 150 is the upper end of the stanchion 103 that is distal from the inferior end 149.

The post 111 is a rectangular block prism, which forms the foundation of the stanchion 103. The first edge 141 of the post 111: 1) is the edge that attaches the stanchion 103 to the slewing bearing 102; and, 2) forms the inferior end 149 of the stanchion 103. The second edge 142 of the post 111: 1) is the edge that projects perpendicularly away from the first edge 141; and, 2) is the edge in which the first channel 112 is formed. The third edge 143 of the post 111: 1) is the edge that is distal from the first edge 141; and, 2) is the edge in which the second channel 113 is formed. The fourth edge 144 of the post 111 is the edge that is distal from the second edge 142.

The first channel 112 is a negative space that is formed in the shape of a rectilinear block within the second edge 142. The second channel 113 is a negative space that is formed in the shape of a rectilinear block within the third edge 143. Both the first channel 112 and the second channel 113 form the channel portion of a T track fastener that is used to attach the drafting triangle 104 to the stanchion 103.

Each of the plurality of bubble levels 114 is a readily and commercially available bubble level, also marketed as a spirit level, which is mounted on the surface of the post 111. The plurality of bubble levels 114 are used to ensure the alignment of the invention 100 relative to the force of gravity 175. The alignment of the invention 100 relative to the force of gravity 175 can be adjusted as necessary using the plurality of bubble levels 114 and readily and commercially available shims.

In the first potential embodiment of the disclosure, the plurality of bubble levels 114 comprises a first bubble level 151, a second bubble level 152, and a third bubble level 153. The first bubble level 151 is a readily and commercially available bubble level that is attached to the stanchion 103. The second bubble level 152 is a readily and commercially available bubble level that is attached to the stanchion 103. The third bubble level 153 is a readily and commercially available bubble level that is attached to the stanchion 103.

The drafting triangle 104 is a modified version of a commercially available drafting triangle 104. The modifications to the drafting triangle 104 are discussed in detail elsewhere in this disclosure. The drafting triangle 104 attaches the laser 105 to the stanchion 103. The drafting triangle 104 is a rigid structure that forms fixed angles. The adjustment of the attachment of the drafting triangle 104 to the stanchion 103 will adjust the height 173 and the polar angle 172 of the laser 105.

The drafting triangle 104 comprises a primary slot 122 and a track rale. The drafting triangle 104 is further defined with a fifth edge 145, a sixth edge 146, a seventh edge 147, a first angle 181, a second angle 182, and a right angle 183. The drafting triangle 104 is formed such that the first angle 181 does not equal the second angle 182. The first angle 181 of the drafting triangle 104 is located where the fifth edge 145 and the seventh edge 147 intersect. The second angle 182 of the drafting triangle 104 is located where the sixth edge 146 and the seventh edge 147 intersect. The right angle 183 of the drafting triangle 104 is located where the fifth edge 145 and the sixth edge 146 intersect.

The track rail 121 forms the rail portion of a T track fastener that is used to attach the drafting triangle 104 to the stanchion 103. The track rail 121 attaches to the fifth edge 145 of the drafting triangle 104. The primary slot 122 is a groove that is formed into the sixth edge 146 of the drafting triangle 104.

The laser 105 is commercially available line laser 105. By line laser 105 is meant that the laser 105 projects a visible line along a surface at which the laser 105 is targeted. The laser 105 comprises a convergent lens 131, a charging port 132, an on off switch 133, and a battery. The laser 105 is further defined with an azimuth angle 171, a polar angle 172, and a height 173.

The azimuth angle 171 is the measured angle of the light generated by the laser 105: 1) as measured between a (potentially arbitrary) reference direction and the generated light; and, 2) that is measured as a projection onto a plane that is perpendicular to the force of gravity 175. The polar angle 172 is the measured angle of the light generated by the laser 105: 1) as measured between a (potentially arbitrary) reference direction and the generated light; and, 2) that is measured as a projection onto a plane that is parallel to the force of gravity 175. The height 173 is the vertical span of distance between the supporting surface 174 and the convergent lens 131 of the laser 105.

The laser 105 is inserted into the primary slot 122 of the drafting triangle 104. The laser 105 is positioned at the right angle 183. By varying the laser 105 attachment between the first channel 112 and the second channel 113 the polar angle 172 of the laser 105 is adjusted. The laser 105 is installed such that the beam generated by the laser 105 passes through the primary slot 122 and on to the targeted surface. The convergent lens 131 is the final lens through which the light generated by the laser 105 passes before exiting the laser 105. The charging port 132 is an electrical device that attaches the battery of the laser 105 to an externally provided source of electricity. The on off switch 133 is a maintained switch that is used to turn on and turn off the laser 105. The battery is a chemical device that converts chemically stored potential energy into electrical energy.

To use the invention 100, the track rail 121 is inserted into a channel selected from the first channel 112 and the second channel 113. The track rail 121 is locked in position using a lock screw 161. The use of a lock screw 161 is a well-known technique in the mechanical arts The selected location of the drafting triangle 104 on the stanchion 103 will determine the polar angle 172 of the laser 105. The azimuth angle 171 of the laser 105 is adjusted by rotating the stanchion 103 using the slewing bearing 102. The height 173 of the laser 105 is adjusted by adjusting the attachment position of the drafting triangle 104 relative to the supporting surface 174.

To generate the laser 105 light, the laser 105 is turned on using the on off switch 133. To charge the laser 105, an external source of electricity is plugged into the charging port 132.

The following definitions were used in this disclosure:

Azimuth: As used in this disclosure, the azimuth, or azimuth angle, refers to an angle that is measured in a plane that is perpendicular to the either the vertical direction or the force of gravity.

Battery: As used in this disclosure, a battery is a container consisting of one or more cells, in which chemical energy is converted into electricity and used as a source of power.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or cone like structure. When the center axes of two cylinder or like structures share the same line they are said to be aligned. When the center axes of two cylinder like structures do not share the same line they are said to be offset.

Center of Rotation: As used in this disclosure, the center of rotation is the point of a rotating plane that does not move with the rotation of the plane. A line within a rotating three dimensional object that does not move with the rotation of the object is also referred to as an axis of rotation.

Cylinder: As used in this disclosure, a cylinder is a geometric structure defined by two identical flat and parallel ends, also commonly referred to as bases, which are circular in shape and connected with a single curved surface, referred to in this disclosure as the face. The cross section of the cylinder remains the same from one end to another. The axis of the cylinder is formed by the straight line that connects the center of each of the two identical flat and parallel ends of the cylinder. Unless otherwise stated within this disclosure, the term cylinder specifically means a right cylinder, which is defined as a cylinder wherein the curved surface perpendicularly intersects with the two identical flat and parallel ends.

Exterior Screw Thread: An exterior screw thread is a ridge wrapped around the outer surface of a tube in the form of a helical structure that is used to convert rotational movement into linear movement.

Force Of Gravity: As used in this disclosure, the force of gravity refers to a vector that indicates the direction of the pull of gravity on an object at or near the surface of the earth.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity.

Interior Screw Thread: An interior screw thread is a groove that is formed around the inner surface of a tube in the form of a helical structure that is used to convert rotational movement into linear movement.

Load Path: As used in this disclosure, a load path refers to a chain of one or more structures that transfers a load generated by a raised structure or object to a foundation or the earth.

Maintained Switch: A used in this disclosure, a maintained switch is a switch that maintains the position that was set in the most recent switch actuation. A maintained switch works in an opposite manner to a momentary switch.

Negative Space: As used in this disclosure, negative space is a method of defining an object through the use of open or empty space as the definition of the object itself, or, through the use of open or empty space to describe the boundaries of an object.

Pedestal: As used in this disclosure, a pedestal is an intermediary load bearing structure that is placed between a supporting surface and an object, structure, or load.

Polar: As used in this disclosure, the polar, or polar angle, refers to an angle that is measured in a plane that is parallel to either the vertical direction or the force of gravity.

Prism: As used in this disclosure, a prism is a 3 dimensional geometric structure wherein: 1) the form factor of two faces of the prism correspond to each other; and, 2) the two corresponding faces are parallel to each other. In this disclosure, when further description is required a prism will be named for the geometric or descriptive name of the form factor of the two corresponding faces. If the form factor of the two corresponding faces has no clearly established or well-known geometric or descriptive name, the term irregular prism will be used. The center axis of a prism is defined as a line that joins the center point of the first corresponding face of the prism to the center point of the second corresponding face of the prism. The center axis of a prism is otherwise analogous the center axis of a cylinder.

Rectilinear: As used in this disclosure, rectilinear is an adjective that is used to describe an object that: 1) moves in a straight line or lines; 2) consists of a straight line or lines; 3) is bounded by a straight line or lines; or, 4) is otherwise characterized by a straight line or lines.

Rectilinear Block: As used in this disclosure, a rectilinear block refers to a three dimensional structure comprising a plurality of rectangular surfaces. Rectilinear blocks are similar to rectangular blocks and are often used to create a structure with a reduced interior volume relative to a rectangular block.

Ridge: As used in this disclosure, a ridge is an elevated or raised portion of a structure.

Shaft: As used in this disclosure, a shaft is a long, narrow and rigid structure that is used as: 1) a structural element of a larger object; or 2) as a grip or lever for a handle. Shafts are often, but not necessarily cylindrical in shape.

Slewing Bearing: As used in this disclosure, a slewing bearing is a device that is used to rotate an object on a horizontal surface. Slewing bearings are often called turntable bearings or a lazy Susan bearing.

Slot: As used in this disclosure, a slot is a long narrow groove or aperture that is formed in an object.

Stanchion: As used in this disclosure, a stanchion refers to a vertical pole, post, or support. Superior: As used in this disclosure, the term superior refers to a directional reference that is parallel to and in the opposite direction of the force of gravity.

Supporting Surface: As used in this disclosure, a supporting surface is a horizontal surface upon which an object is placed. Within this disclosure, it is assumed that the object is placed on the supporting surface in an orientation that is appropriate for the normal or anticipated use of the object.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

T Track Fastener: As used in this disclosure, a T track fastener is a fastening device that is used to attach a first object to a second object by sliding the first object on to the second object. The T track fastener further comprises a rail and a channel. The rail is attached to the first object and the channel is attached to the second object such that the first object is attached to the second object when the rail is inserted into the channel.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An optical surveying instrument comprising:
   a pedestal, a slewing bearing, a stanchion, a drafting triangle, and a laser;
   wherein the drafting triangle attaches the laser to the stanchion;
   wherein the slewing bearing attaches the stanchion to the pedestal;
   wherein the laser generates a beam of light that forms a straight line along a surface;
   wherein the optical surveying instrument is a leveling tool;
   wherein the laser is further defined with an azimuth angle, a polar angle, and a height;
   wherein the azimuth angle, the polar angle and the height of the laser are adjustable;
   wherein the pedestal is the inferior structure of the optical surveying instrument;
   wherein the pedestal is the final link in the load path to the supporting surface;
   wherein the stanchion is further defined with an inferior end and a superior end;
   wherein the slewing bearing attaches the inferior end of the stanchion to the superior surface of the slewing bearing;
   wherein the post is a rectangular block prism which forms the foundation of the stanchion;
   wherein the stanchion projects perpendicularly away from the supporting surface;
   wherein the inferior end of the stanchion attaches to the slewing bearing such that the slewing bearing will rotate the stanchion such that the axis of rotation of the stanchion is aligned with the center axis of the stanchion;
   wherein the stanchion comprises a post, a first channel, a second channel, and a plurality of bubble levels;
   wherein the first channel, the second channel, and the plurality of bubble levels are attached to the post;
   wherein the post is further defined with a first edge, a second edge, a third edge, and a fourth edge;
   wherein the first edge forms the inferior end of the stanchion;
   wherein the second edge is a vertical edge of the post;
   wherein the third edge forms the superior end of the stanchion;
   wherein the fourth edge is a vertical edge of the post;
   wherein the first edge of the post attaches to the slewing bearing;
   wherein the first channel is a rectilinear negative space that is formed in the second edge;
   wherein the second channel is a rectilinear negative space that is formed in the third edge;
   wherein the first channel forms the channel portion of a T track fastener;
   wherein the second channel forms the channel portion of a T track fastener.

2. The optical surveying instrument according to claim 1 wherein each of the plurality of bubble levels mounts on the post.

3. The optical surveying instrument according to claim 2
   wherein the drafting triangle is a rigid structure that forms fixed angles;
   wherein the adjustment of the attachment of the drafting triangle to the stanchion will adjust the height of the laser;
   wherein the adjustment of the attachment of the drafting triangle to the stanchion will adjust the polar angle of the laser.

4. The optical surveying instrument according to claim 3
   wherein the drafting triangle further comprises a track rail and a primary slot;
   wherein the track rail and the primary slot are formed in the drafting triangle;
   wherein the drafting triangle is further defined with a fifth edge, a sixth edge, a seventh edge, a first angle, a second angle, and a right angle;
   wherein the first angle of the drafting triangle is located where the fifth edge and the seventh edge intersect;
   wherein the second angle of the drafting triangle is located where the sixth edge and the seventh edge intersect;
   wherein the right angle of the drafting triangle is located where the fifth edge and the sixth edge intersect;
   wherein the drafting triangle is formed such that the first angle does not equal the second angle.

5. The optical surveying instrument according to claim 4 wherein the primary slot is a groove that is formed into the sixth edge of the drafting triangle.

6. The optical surveying instrument according to claim 5 wherein the track rail forms the rail portion T track fastener.

7. The optical surveying instrument according to claim 6 wherein the track rail is sized such that the rail can be inserted into a channel selected from the group consisting of the first channel, the second channel.

8. The optical surveying instrument according to claim 7 wherein the laser is line laser;

wherein the laser comprises a convergent lens, a charging port, and an on off switch;

wherein the convergent lens is the final lens through which the light generated by the laser passes before exiting the laser;

wherein the charging port is an electrical device that attaches to the laser;

wherein the on off switch is a maintained switch that is used to turn on and turn off the laser;

wherein the azimuth angle is the measured angle of the light generated by the laser as measured between a reference direction and the generated light;

wherein the azimuth angle is measured as a projection onto a plane that is perpendicular to the force of gravity;

wherein the polar angle is the measured angle of the light generated by the laser as measured between a reference direction and the generated light;

wherein the polar angle is measured as a projection onto a plane that is parallel to the force of gravity;

wherein the height is the vertical span of distance between the supporting surface and the convergent lens of the laser.

9. The optical surveying instrument according to claim 8 wherein the laser is inserted into the primary slot of the drafting triangle.

10. The optical surveying instrument according to claim 9 wherein the laser is positioned at the right angle of the drafting triangle.

11. The optical surveying instrument according to claim 10 wherein the attachment of the drafting triangle to which the laser determines the polar angle of the laser.

12. The optical surveying instrument according to claim 11 wherein the slewing bearing adjusts the azimuth angle.

13. The optical surveying instrument according to claim 12 wherein the plurality of bubble levels measure the angle of the stanchion relative to the force of gravity.

14. The optical surveying instrument according to claim 13 wherein the drafting triangle attaches to the stanchion by inserting the track rail into the first channel;

wherein the drafting triangle is secured to the stanchion using a locking screw.

15. The optical surveying instrument according to claim 13 wherein the drafting triangle attaches to the stanchion by inserting the track rail into the second channel;

wherein the drafting triangle is secured to the stanchion using a locking screw.

* * * * *